United States Patent [19]

Wnuk

[11] Patent Number: 4,476,180

[45] Date of Patent: Oct. 9, 1984

[54] NONBLOCKING ELASTOMERIC POLYMER BLENDS OF ABA BLOCK COPOLYMER AND ETHYLENE-VINYL ACETATE COPOLYMER

[75] Inventor: Andrew J. Wnuk, Fairfield, Ohio

[73] Assignee: The Procter & Gamble Company, Cincinnati, Ohio

[21] Appl. No.: 462,824

[22] Filed: Feb. 1, 1983

[51] Int. Cl.$^3$ .................. C08L 53/02; C08L 23/08; C08L 31/04

[52] U.S. Cl. .................. 428/220; 524/524; 525/93

[58] Field of Search .................. 525/93; 428/220; 524/524

[56] References Cited

U.S. PATENT DOCUMENTS

| | | | |
|---|---|---|---|
| 3,424,649 | 1/1969 | Nyberg et al. | 161/253 |
| 3,562,355 | 2/1971 | Holden | 260/859 |
| 3,562,356 | 2/1971 | Nyberg et al. | 260/876 |
| 3,576,911 | 4/1971 | Maxey | 260/876 |
| 3,630,980 | 12/1971 | Russell | 260/27 |
| 3,769,417 | 10/1973 | van Breen | 424/78 |
| 3,985,702 | 10/1976 | Himes | 260/33.6 AQ |
| 3,994,439 | 11/1976 | Van Breen et al. | 239/54 |
| 4,003,860 | 1/1977 | LeClerc | 260/2.5 HA |
| 4,039,629 | 8/1977 | Himes et al. | 260/876 B |
| 4,060,510 | 11/1977 | Himes | 260/33.6 AQ |
| 4,082,877 | 4/1978 | Shadle | 428/35 |
| 4,140,162 | 2/1979 | Gajewski et al. | 525/93 |
| 4,171,411 | 10/1979 | Ehrenfreund | 521/98 |
| 4,173,612 | 11/1979 | Kelly | 264/176 |
| 4,178,337 | 12/1979 | Hall et al. | 264/28 |
| 4,199,490 | 4/1980 | Kamiya et al. | 260/29.7 D |
| 4,208,315 | 6/1980 | Zweig | 260/33.6 AQ |
| 4,216,131 | 8/1980 | Himes et al. | 260/33.6 AQ |
| 4,300,562 | 11/1981 | Pieniak | 128/287 |
| 4,305,990 | 12/1981 | Kelly | 428/220 |
| 4,329,309 | 5/1982 | Kelly | 264/167 |

FOREIGN PATENT DOCUMENTS 1188922  4/1970  United Kingdom .................. 43/8

OTHER PUBLICATIONS

Aggarwal, S. L., "Structure and Properties of Block Polymers and Multiphase Polymer Systems; an Overview of Present Status and Future Potential", Polymer, vol. 17, (Nov. 1976), pp. 938-956.

Walker, B. M. (Editor), Handbook of Thermoplastic Elastomers, 1979, p. 89.

UK Patent Application No. 2,016,262, Published 9/16/79.

Vitalis, E. A., "Blocking", Encyclopedia of Polymer Science and Technoogy, vol. 2, (1970), pp. 529-531.

"New Rubber is Backed by Stars", Chemical Week, Jun. 11, 1975, p. 35.

Primary Examiner—Wilbert J. Briggs, Sr.
Attorney, Agent, or Firm—Milton B. Graff, IV; John V. Gorman; Richard C. Witte

[57] ABSTRACT

Thermoplastic elastomeric films comprise from about 40% to about 80% of an elastomeric block copolymer and from about 20% to about 60% of an ethylene-vinyl acetate copolymer. The block copolymer has at least two monoalkenyl arene polymer end blocks and at least one elastomeric conjugated diene midblock. The monoalkenyl arene polymer blocks comprise from about 8% to about 55% by weight of the block copolymer. The block copolymer has a melt index of less than about 10. The ethylene-vinyl acetate copolymer comprises from about 22% to about 33% vinyl acetate and has a melt index of less than about 0.6. The film is from about 0.03 mm to about 0.15 mm in thickness.

23 Claims, 2 Drawing Figures

NONBLOCKING ELASTOMERIC POLYMER BLENDS OF ABA BLOCK COPOLYMER AND ETHYLENE-VINYL ACETATE COPOLYMER

TECHNICAL FIELD

This invention relates to thermoplastic elastomers which are blends of an elastomeric block copolymer having at least two monoalkenyl arene polymer end blocks and at least one elastomeric conjugated diene mid block and a random ethylene-vinyl acetate copolymer; and, more specifically, to thin films made from such thermoplastic elastomers.

BACKGROUND OF THE INVENTION

Thermoplastic elastomers are relatively new types of polymeric composition that have become commercially available in recent years. These polymers have the useful property of behaving like rubber at normal use temperatures, without the need for vulcanization. Because they are not vulcanized, they can be processed by many of the normal thermoplastic polymer procedures at elevated temperatures.

Such thermoplastic elastomers are commonly used to make shoe soles, foam products, strips incorporating chemicals and perfumes to provide a time release for such chemicals and perfumes, and pressure sensitive adhesives. Examples of thermoplastic elastomers used for such purposes are disclosed in the following U.S. Pat. Nos. 3,562,355 issued to Holden on Feb. 9, 1971; 3,562,356 issued to Nyberg & Hendricks on Feb. 9, 1971; 3,576,911 issued to Maxey on Apr. 27, 1971; 3,630,980 issued to Russell on Dec. 28, 1971; 3,769,417 issued to Van Breen on Oct. 30, 1973; 3,994,439 issued to Van Breen & Nitters on Nov. 30, 1976; 4,003,860 issued to LaClerc on Jan. 18, 1977; 4,039,629 issued to Himes & Mendoza on Aug. 2, 1977; 4,171,411 issued to Ehrenfreund on Oct. 16, 1979; 4,208,315 issued to Zweig on Jan. 17, 1980; and 4,216,131 issued to Himes & Zweig on Aug. 5, 1980.

The present invention involves thin films of thermoplastic elastomers which are blends of certain monoalkenyl arene and conjugated diene block copolymers and certain ethylene-vinyl acetate copolymers. Thermoplastic elastomeric films of this general type are disclosed in the following U.S. Pat. Nos. 3,424,649 issued to Nyberg & Hendricks on Jan. 28, 1969; 4,082,877 issued to Shadle on Apr. 4, 1978; 4,178,337 issued to Hall, Korpman & Sinker on Dec. 11, 1979; 4,199,490 issued to Kamiya, Satake, Sone & Teraoka on Apr. 22, 1980; and 4,329,309 issued to Kelly on May 11, 1982. Thermoplastic elastomers made from blends of monoalkenyl arene and conjugated diene block copolymers blended with other thermoplastic resins are disclosed in the following references: U.S. Pat. Nos. 4,173,612 issued to Kelly on Nov. 6, 1979; 4,300,562 issued to Pieniak on Nov. 17, 1981; and 4,305,990 issued to Kelly on Dec. 15, 1981; and U.K. patent application No. 2,016,262 filed on Jan. 26, 1979.

Thermoplastic elastomeric films made from elastomeric block copolymers of monoalkenyl arenes and conjugated dienes alone generally exhibit good strength and elastic properties; however, such films exhibit excessive blocking. Blocking is the tendency of a film to adhere to itself. When films made from block copolymers of monoalkenyl arenes and conjugated dienes are stored on a roll or in stacks, the films layers become difficult to unroll or unstack after a period of time due to their blocking tendency. Such blocking tendency can cause the film to tear when the film is being unwound from a roll or being unstacked.

In achieving the present invention, it was found that the addition of certain thermoplastic polymers and copolymers to the block copolymers of monoalkenyl arenes and conjugated dienes will substantially reduce the blocking tendency of the films. However, the elastic properties of the resulting film are almost always poorer than films of the block copolymer alone in that they fail to return to their original length after being stretched under certain conditions. The present invention involves the addition of particular thermoplastic copolymers to block copolymers of monoalkenyl arenes and conjugated dienes which results in films having substantially reduced blocking tendency while retaining good elastic properties.

SUMMARY OF THE INVENTION

It is an object of the present invention to provide thermoplastic elastomeric films having good strength and elasticity properties.

It is a further object of the present invention to provide such thermoplastic elastomeric films having low blocking tendency.

It is still a further object of the present invention to provide such thermoplastic elastomeric films which can be produced on conventional film processing equipment.

The invention described herein is a thermoplastic elastomeric film comprising from about 40% to about 80% of an elastomeric block copolymer having at least two monoalkenyl arene polymer end blocks and at least one elastomeric conjugated diene mid block, with the monoalkenyl arene blocks comprising from about 8% to about 55% by weight of the block copolymer and the block copolymer having a melt index of less than about 10; and from about 20% to about 60% of an ethylene-vinyl acetate copolymer comprising from about 22% to about 33% vinyl acetate and having a melt index of less than about 0.6. The film is from about 0.03 mm to about 0.15 mm in thickness.

DETAILED DESCRIPTION OF THE INVENTION

Figure 1:
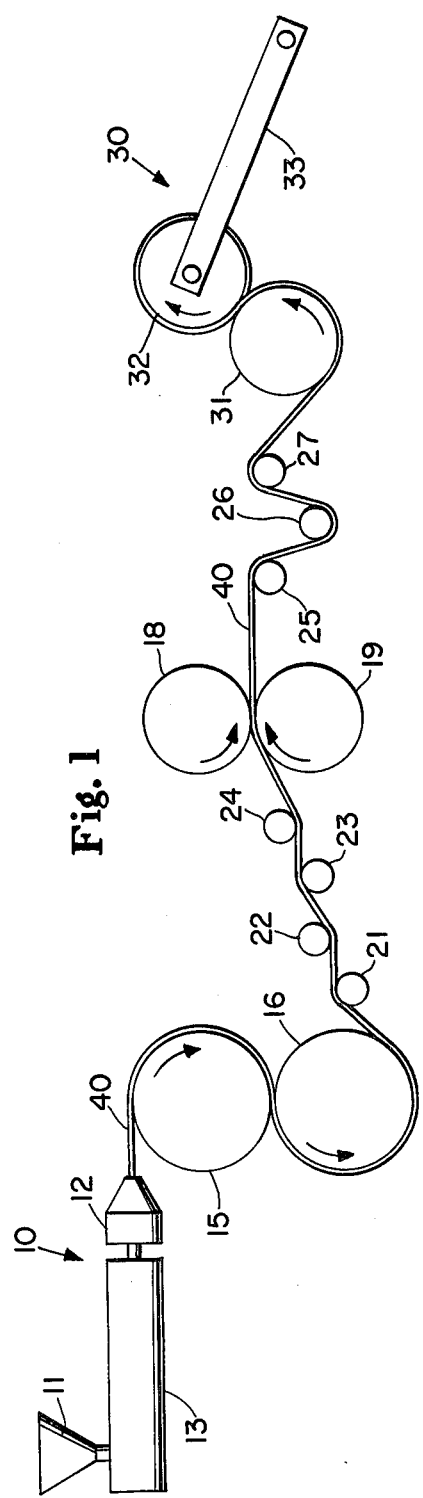
FIG. 1 is a schematic diagram of a process for making thermoplastic elastomeric films of the present invention.

This invention relates to thermoplastic elastomeric films that are a blend of at least two copolymers. One copolymer is a block copolymer containing blocks of a monoalkenyl arene polymer and a conjugated diene polymer. The second copolymer is an ethylene-vinyl acetate copolymer. Optional ingredients which may also be included in the polymer blends of the present invention include conventional antiblock concentrates.

The thermoplastic elastomeric polymer blends of the present invention are formulated such that they can be processed on conventional thermoplastic film making equipment. The thermoplastic elastomeric films produced from such blends are from about 0.03 mm to about 0.15 mm in thickness, preferably from about 0.04 mm to about 0.08 mm in thickness.

The Monoalkenyl Arene/Conjugated Diene Block Copolymer

The elastomeric block copolymers contemplated for use in the present invention are known materials having blocks of monoalkenyl arene polymer and blocks of conjugated diene polymer. The polymer blocks are arranged such that there are at least two monoalkenyl arene polymer end blocks A and at least one elastomeric conjugated diene mid block polymer D. The monoalkenyl arene polymer blocks comprise from about 8% to about 55% by weight of the block copolymer. The molecular weight of the block copolymer is such that its melt index is less than about 10 as determined by ASTM Method D 1238. "Standard Test Method for FLOW RATES OF THERMOPLASTICS BY EXTRUSION PLASTOMER", Condition E.

A review article discussing such block copolymers is the following: Aggarwal, S. L., "Structure and Properties of Block Polymers and Multiphase Polymer Systems: An Overview of Present Status and Future Potential", Polymer, Vol. 17 (Nov., 1976), pp. 938-956. Two representative types of thermoplastic elastomers are linear block copolymers A-(D-A)$_n$, especially A-D-A; and star or radial block copolymers having from 4-29 arms connected to a common center, each arm being a D-A block copolymer.

For the present invention, the preferred monoalkenyl arene polymer is polystyrene; and the preferred conjugated diene polymers are polybutadiene and polyisoprene, especially preferred is polybutadiene. Preferred elastomeric block copolymers are the linear triblock copolymers (A-D-A) commercially available from the Shell Chemical Company, Polymers Division, Houston, Tex., under the tradename Kraton. Expecially preferred are the linear triblock copolymers having polystyrene end blocks and a polybutadiene mid block (S-B-S). Most preferred is Kraton 2104. Kraton 2104 has a melt index of about 7 as determined by ASTM Method D 1238, Condition E.

The thermoplastic elastomeric films of the present invention may contain from about 40% to about 80% elastomeric block copolymer; preferably from about 40% to about 60%; especially preferred is from about 45% to about 55%.

The Ethylene-Vinyl Acetate Copolymer

Certain ethylene-vinyl acetate copolymers (EVA's) have been found to substantially reduce the blocking tendency of films made from elastomeric block copolymers without substantial loss of strength and elasticity properties. The fact that EVA can act as an antiblock agent is disclosed in the following article: Vitalis, E. A., "Blocking", Encyclopedia of Polymer Science and Technology, Vol. 2 (1970), pp. 529-531.

The EVA's used in the present invention are linear chains containing a random array of ethylene and vinyl acetate moieties. The EVA's utilized in the present invention have a vinyl acetate content of from about 22% to about 33%, especially preferred is about 28% vinyl acetate. The EVA's have a molecular weight such that the melt index of the EVA is less than about 0.6, preferably less than about 0.4, more preferably about 0.3, as determined by ASTM Method D 1238, Condition B. EVA's suitable for use in the present invention are commercially available from U.S. Industrial Chemicals, New York, N.Y.; most preferred is their material UE 645 containing 28% vinyl acetate and having a melt index of about 0.3.

The thermoplastic elastomers of the present invention may contain from about 20% to about 60% EVA, preferably from about 20% to about 50%; especially preferred is from about 30% to about 40%.

Optional Constituents

Preferred thermoplastic elastomeric films of the present invention may contain from 0 to about 30% of commercial antiblock substances, preferably from about 10% to about 30%. The preferred antiblock substances used in films of the present invention are blends of polyethylene and silica. Most preferred is an antiblock concentrate that is a 50/50 mixture by weight of polyethylene and silica available commercially from U.S. Industrial Chemicals, New York, N.Y., as CM 19002.

Reduction of blocking in the films of the present invention can also be obtained by loading the film surface with small particles or powders such as chalk, clay, silica, and similar materials. Powdered polymeric materials (e.g. polytetrafluoroethylene) can also be used to reduce blocking when applied to the surface of films of the present invention. Such film surface treatments can be used to reduce blocking alone or in combination with other antiblock methods described herein. The quantity of powder antiblock substance commonly added to the surface of a film, when used, is from about 0.5 g/m$^2$ to about 5 g/m$^2$.

Antistatic agents may be incorporated in films of the present invention; examples of such agents include ethoxylated amines and quarternary amine salts having organic constituents of about 12-18 carbon atoms in length. Agents of this type slowly defuse to the surface of the film and, because of their ionic character, form an electrically conductive layer on the surface of the film. Antistatic agents commonly constitute from about 1% to about 5% of the weight of the films, when used.

Slip agents may be incorporated into the films of the present invention to reduce drag over rollers and other forming equipment. Examples of such agents are those commonly derived from amides of fatty acids having about 12-22 carbon atoms. Such agents may augment the antiblocking properties of the films of the present invention. Such slip agents are commonly incorporated in films from about 0.05% to about 3% of the weight of the films when used.

In order to minimize degradation of films of the present invention during processing by extrusion or other techniques, heat stabilizers and antioxidants may be added to the polymer formulations. Examples of heat stabilizers that may be used are organic phosphite compounds and other organic substances such as trihydroxy-butyrophenone. Examples of primary antioxidants used in films of the present invention are those derived from hindered phenolic (e.g. 2,6-ditertiarybutyl-p-cresol) and various amine compounds. Secondary antioxidants may be used with the primary antioxidants; derivatives of thiodipropionic acid or aromatic phosphite compounds are examples of such secondary antioxidants. Heat stibilizers and antioxidants are incorporated in the polymeric formulations at a level of from about 0.1% to about 2.5%, when used.

Degradation of the films of the present invention by exposure to ultraviolet light can be moderated by the addition of photostabilizers. Examples of such photostabilizers include derivatives of benzophenone. Such photostabilizers are generally incorporated in the polymer formulations at a level of from about 0.1% to about 3%, when used.

Pigments may be added to the polymer formulations to impart a particular color to the resulting films. Pigments are typically added to the resin blend in the form of concentrates, formulated to improve dispersion of the pigment, at levels of from about 0.5% to about 4%, when used.

The optional constituents described hereinabove may be used alone or in combination with any or all of the other optional constituents.

TEST METHODS

The following test methods were used to evaluate the thermoplastic elastomeric films of the present invention and materials from which such films were made.

Melt Index of Polymers

The melt index of the monoalkenyl arene/conjugated diene block copolymers and the ethylene-vinyl acetate copolymers is determined by the use of ASTM Method D 1238, "Standard Test Method for FLOW RATES OF THERMOPLASTICS BY EXTRUSION PLASTOMER." This test method measures the melt index of polymers by measurement of the rate of extrusion of molten material through a die of specified length and diameter under prescribed conditions of temperature and piston load. This rate of extrusion varies inversely with the molecular weight of the polymer; a high molecular weight polymer will display a low melt flow rate and hence a low melt index, while a lower molecular weight polymer will display a higher melt flow rate and hence a higher melt index. Melt indexes of the monoalkynel arene/conjugated diene block copolymers have been determined by ASTM Method D 1238, Condition E; the melt indexes of the ethylene-vinyl acetate copolymers have been determined by Condition B of the same method.

Permanent Set (Elasticity)

The permanent set of elastomeric films is determined by taking a strip of film 2.5 cm wide and 15 cm long, grasping the ends of the film, and stretching it to twice its original length. The film is held at that extension for 10 minutes at room temperature and then allowed to relax. The permanent set of the film is determined as the percent increase in length of the film after stretching and relaxation compared to the initial length of the film prior to stretching. A low permanent set is desired for most purposes.

Blocking Force

The force required to overcome blocking of films is measured using a stack of twelve 15 cm×2.5 cm strips of film that are subjected to a load of 7 kg/cm$^2$ for 100 hours at a temperature of 46° C. At the end of this time, 180° peel tests are run on an Instron at a cross head speed of 12.7 cm per minute. Every other interface in a stack is tested, thereby achieving five measurements per stack. The maximum force required during the separation of two strips is recorded as the blocking force; it is reported in grams per 2.5 cm of film width. The average of the five maximum forces is reported as the blocking force for the film stack. Low blocking force is desired for most purposes.

Tensile Strength

The ultimate tensile strength of elastomeric films is determined by the use of ASTM Method D 412 using an Instron Model 1122 testing machine. A test specimen is cut from a sheet of film using a standard ASTM dumbbell die (Die C). The specimen is cut such that the tensile strength of the film will be measured in the desired direction, usually the direction of extrusion of the film (machine direction-MD), or a direction perpendicular to the direction of extrusion of the film (cross-machine direction-CD). The rate of jaw separation of the Instron Machine used for testing samples in the Examples below was 25.4 cm/min.

Tear Strength

The initial tear resistance of elastomeric films is determined by the use of ASTM Method D 1004 using an Instron Model 1122 testing machine. In referring to tear strength, the direction of propagation of the tear is generally referred to and is usually in the direction of extrusion of the film (machine direction-MD), or in a direction perpendicular to the direction of extrusion of the film (cross-machine direction-CD). In measuring tear resistance of samples of the Examples below, the rate of jaw separation of the Instron machine was 25.4 cm/min instead of 5.1 cm/min as specified in ASTM Method D 1004.

Method of Manufacture

The thermoplastic elastomeric films of the present invention may be produced using conventional procedures for producing films of blended polymers on conventional film making equipment. A method of making a preferred film of the present invention is described in Example 1 which follows.

Industrial Applicability

The thermoplastic elastomeric films of the present invention may be used in a wide variety of applications where a thin, elastic material would be useful. Such films are particularly useful as low cost elastic members for disposable wearing apparel such as diapers and incontinent briefs; they may be used as leg bands or waist bands in such applications.

The following examples will illustrate the invention, but are not intended to be in any way limiting thereof.

EXAMPLE 1

A thermoplastic elastomeric film of the present invention is made from a blend of 50% Kraton 2104, 30% UE 645, and 20% CM 19002. The raw materials which are available in pellet form are initially separately dried at 100°–105° F. in a circulating air oven for at least four hours to eliminate trace amounts of moisture which may cause foaming during production of the film. The pellets of the components are dry blended prior to introduction to an extruder. (The pellets may be melted and mixed if insufficient mixing occurs in the extruder to produce a uniform film.)

A schematic diagram depicting an exemplary process for producing a thermoplastic elastomeric film of the present invention from such a dry blend of component pellets is shown in FIG. 1. The blend of pellets is fed to hopper 11 of extruder 10 which may be, for example, an NRM Model PM III extruder equipped with a 6.35 cm diameter general purpose screw (L/D=30/1) within barrel 13.

The following exemplary process conditions may be used to produce a thermoplastic elastomeric film of the present invention. The temperature of extruder barrel 13 varies from about 174° C. near the inlet at hopper 11 to about 215° C. near the discharge at die 12; the screw speed is about 40 rpm. The temperature of die 12 is held at about 215° C., and the extrusion gap of die 12 is nominally about 0.25 mm high and 76.2 cm wide. Extruded film 40 passes from die 12 over polish rolls 15 and 16 which are preferably about 30.5 cm in diameter, have surface temperatures maintained at about 20° C. and are driven at a surface speed of about 31 km per minute. Thermoplastic elastomeric film 40 then passes across idler rolls 21, 22, 23 and 24 and through the nip of haul-off rolls 18 and 19. The surface temperatures of haul-off rolls 18 and 19 are maintained at about 25° C., and they are driven at a surface speed of about 31 km per minute. Thermoplastic elastomeric film 40, which then passes across idler rolls 25, 26 and 27, is preferably about 0.05 mm thick as it reaches surface winding system 30.

A film windup system such as surface winding system 30 is preferably used to minimize winding pressure in order to minimize blocking of thermoplastic elastomeric film 40 when stored in rolls. Surface winding system 30 consists of drive roll 31 and windup roll 32 on pivot arm 33. Drive roll 31 is preferably a rubber roll having a diameter of about 20 cm and is driven such that its surface speed is maintained at about the same speed (31 km per minute) as that of film 40 moving through the system. This is readily done by maintaining a constant rotational speed of drive roll 31; this would not be possible if drive roll 31 were also used as a windup roll for collecting film 40. Instead, film 40 is collected on windup roll 32 which is supported by pivot arm 33 and can therefore move away from drive roll 31 as the thickness of film 40 builds up on windup roll 32. Windup roll 32 is driven by virtue of its surface being continually in contact with drive roll 31, thus its surface speed is always the same as that of drive roll 31.

EXAMPLE 2

Figure 2:
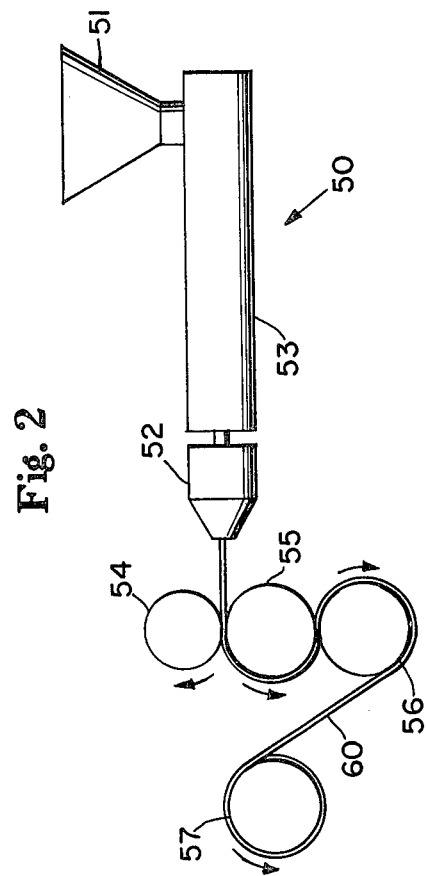
FIG. 2 is a schematic diagram of an alternative process for making thermoplastic elastomeric films of the present invention.

A thermoplastic elastomeric film of the present invention is made using the same ingredients and proportions as that of Example 1. FIG. 2 is a schematic diagram depicting a second exemplary process that may be used to produce thermoplastic elastomeric films of the present invention.

The same blend of raw material pellets as used in Example 1 may be fed to hopper 51 of extruder 50. Extruder 50 is, for example, a Braybender 1.9 cm diameter screw extruder equipped with die 52 having a gap about 0.254 mm high and about 15 cm wide.

The following are exemplary conditions for producing thermoplastic elastomeric film 60 of the present invention. The temperature of barrel 53 of extruder 50 varies from about 170° C. near the inlet at hopper 51 to about 190° C. near the discharge at die 52. The screw (L/D=24/1) within barrel 53 is controlled at a speed of about 49 rpm. The speed of chill rolls 54, 55 and 56 and windup roll 57 are controlled so as to draw film 60 to a thickness of about 0.076 mm. Thermoplastic elastomeric film 60 is cooled by passing through the nips and across chilled rolls 54, 55 and 56 which are chilled by cooling water at a temperature of about 20° C.–25° C. flowing through them. As long as only small rolls of film are produced on the equipment depicted in FIG. 2, a conventional center windup roll 57 can be employed without excessive blocking of film 60 occurring in the rolls.

EXAMPLE 3

A thermoplastic elastomeric film is made from a blend of 50% Kraton 2104, 30% UE 634-04, and 20% CM 19002. UE 634-04 is an EVA available from U.S. Industrial Chemicals having a vinyl acetate content of 28% and a melt index of 0.6 as determined by ASTM Method D 1238, Condition B. The equipment used and process conditions were the same as those described in Example 2.

EXAMPLE 4

A thermoplastic elastomeric film is made from a blend of 50% Kraton 2104, 30UE 646-04, and 20% CM 19002. UE 646-04 is an EVA available from U.S. Industrial Chemicals having a vinyl acetate content of 28% and a melt index of 3.1 as measured by ASTM Method D 1238, Condition B. The equipment used and process conditions were the same as those described for Example 2 except that the screw speed of the extruder was controlled at 58 rpm.

EXAMPLE 5

A thermoplastic elastomeric film is made from a blend of 50% Kraton 2104, 30% UE 636-04, and 20% CM 19002. UE 636-04 is an EVA available from U.S. Industrial Chemicals having a vinyl acetate content of 28% and a melt index of 5.3 as measured by ASTM Method D 1238, Condition B. The equipment used and process conditions were the same as described for Example 4.

A comparison of the thermoplastic elastomeric films of Examples 2, 3, 4 and 5 are presented in Table 1:

TABLE 1

| Example | Melt Index of EVA | MD Tensile Strength (kg/cm$^2$) | MD Tear Strength (kg/mm) | Permanent Set (%) | Blocking Force (g/2.5 cm) |
|---|---|---|---|---|---|
| 2 | 0.3 | 104 | 3.3 | 12 | 32 |
| 3 | 0.6 | 72 | 2.7 | 20 | 56 |
| 4 | 3.1 | 39 | 2.1 | 21 | 100 |
| 5 | 5.3 | 34 | 2.2 | 20 | 109 |

The comparison of the properties of the films from Examples 2–5 illustrates the effect of varying the melt index of EVA in the films. The lower melt index of the EVA used in Example 2 produced a thermoplastic elastomeric film having substantially greater MD (machine direction) tensile and tear strengths and substantially lower permanent set and blocking tendency than the films of Examples 3–5 using EVA's having higher melt indexes.

EXAMPLE 6

A thermoplastic elastomeric film is made from a blend of 60% Kraton 2104, 30% UE 630 and 10% CM 19002. UE 630 is an EVA available from U.S. Industrial Chemicals having a vinyl acetate content of 18% and a melt index of 1.5. The equipment used and process conditions were the same as those for Example 2.

EXAMPLE 7

A thermoplastic elastomeric film is made from a blend of 60% Kraton 2104, 20% UE 630, and 20% CM 19002, using the same equipment and process conditions used to produce the film of Example 2.

A comparison of the properties of the films made from Examples 2, 6 and 7 is provided in Table 2.

TABLE 2

| Example | MD Tensile Strength (kg/cm²) | MD Tear Strength (kg/mm) | Permanent Set (%) | Blocking Force* (g/2.5 cm) |
|---|---|---|---|---|
| 2 | 104 | 3.3 | 12 | 11 |
| 6 | 85 | 3.4 | 20 | 9 |
| 7 | 63 | 2.3 | 24 | 7 |

*The temperature used for the Blocking Force test was 38° C. rather than 46° C.

The comparison properties of the films produced in Examples 2, 6 and 7 illustrates the effect of varying vinyl acetate content of the EVA. Decreasing the vinyl acetate content of the EVA resulted in films having lower blocking tendency even though the Kraton 2104 content was raised to 60% for Examples 6 and 7. However, the films of Examples 6 and 7 have a very high permanent set compared to the film of Example 2. Thus, the decrease in vinyl acetate content of the EVA reduced the elastomeric character of the films of Examples 6 and 7. Even an increase in Kraton 2104 to 60% could not overcome the decrease in elasticity imparted by the EVA containing 18% vinyl acetate. The films of Examples 6 and 7 had lower MD tensile strength and about the same or lower MD tear strength compared to the film of Example 2.

While particular embodiments of the present invention have been illustrated and described, it would be obvious to those skilled in the art that various changes and modifications can be made without departing from the spirit and scope of the invention. It is intended to cover, in the appended claims, all such modifications that are within the scope of this invention.

What is claimed is:

1. An elastomeric film comprising:
   (a) from about 40% to about 80% of an elastomeric block copolymer having at least two monoalkenyl arene polymer end blocks A and at least one elastomeric conjugated diene mid block D, said blocks A comprising from about 8% to about 55% by weight of said block copolymer, said block copolymer having a melt index of less than about 10; and
   (b) from about 20% to about 60% of an ethylene-vinyl acetate copolymer, said ethylene-vinyl acetate copolymer comprising from about 22% to about 33% vinyl acetate and having a melt index of less than about 0.6;
   where said film is from about 0.03 mm to about 0.15 mm in thickness.

2. The film of claim 1 wherein said film is thermoplastic.

3. The film of claim 2 wherein said monoalkenyl arene polymer is polystyrene and said conjugated diene polymer is selected from a group consisting of polybutadiene and polyisoprene.

4. The film of claim 3 wherein said conjugated diene polymer is polybutadiene.

5. The film of claim 4 wherein said elastomeric block copolymer is a linear triblock copolymer A-D-A.

6. The film of claim 2 wherein said film further comprises:
   (c) from about 10% to about 30% of an antiblock concentrate.

7. The film of claim 5 wherein said film further comprises:
   (c) from about 10% to about 30% of an antiblock concentrate.

8. The film of claim 7 wherein said antiblock concentrate is a blend of polyethylene and silica.

9. The film of claim 8 wherein said antiblock concentrate contains about 50% polyethylene and about 50% silica.

10. The film of claim 5 wherein said film comprises from about 40% to about 60% of said elastomeric block copolymer and from about 20% to about 50% of said ethylene-vinyl acetate copolymer.

11. The film of claim 7 wherein said film comprises from about 40% to about 60% of said elastomeric block copolymer and from about 20% to about 50% of said ethylene-vinyl acetate copolymer.

12. The film of claim 5 wherein the melt index of said ethylene-vinyl acetate copolymer is less than about 0.4.

13. The film of claim 11 wherein the melt index of said ethylene-vinyl acetate copolymer is less than about 0.4.

14. The film of claim 11 wherein the melt index of said ethylene-vinyl acetate copolymer is about 0.3.

15. The film of claim 5 wherein said film is from about 0.04 mm to about 0.08 mm in thickness.

16. The film of claim 11 wherein said film is from about 0.04 mm to about 0.08 mm in thickness.

17. The film of claim 13 wherein said film is from about 0.04 mm to about 0.08 mm in thickness.

18. The film of claim 5 wherein said elastomeric block copolymer has a melt index of about 7.

19. The film of claim 14 wherein said elastomeric block copolymer has a melt index of about 7.

20. The film of claim 17 wherein said elastomeric block copolymer has a melt index of about 7.

21. The film of claim 5 wherein the vinyl acetate content of said ethylene-vinyl acetate copolymer is about 28%.

22. The film of claim 14 wherein the vinyl acetate content of said ethylene-vinyl acetate copolymer is about 28%.

23. The film of claim 20 wherein the vinyl acetate content of said ethylene-vinyl acetate copolymer is about 28%.

* * * * *

UNITED STATES PATENT AND TRADEMARK OFFICE
CERTIFICATE OF CORRECTION

PATENT NO.  : 4,476,180
DATED       : October 9, 1984
INVENTOR(S) : Andrew J. Wnuk It is certified that error appears in the above-identified patent and that said Letters Patent is hereby corrected as shown below:

Column 3, line 15, "." should read -- , --.

Column 5, line 15, "evalulate" should read -- evaluate --.

Column 8, line 15, "30UE" should read -- 30% UE --.

Signed and Sealed this

Sixteenth Day of April 1985

[SEAL]

Attest:

DONALD J. QUIGG

*Attesting Officer*    Acting Commissioner of Patents and Trademarks